J. E. PHILLIPS.
GUARD FOR POWER PRESSES.
APPLICATION FILED APR. 14, 1920.
1,366,704.
Patented Jan. 25, 1921.
6 SHEETS—SHEET 2.
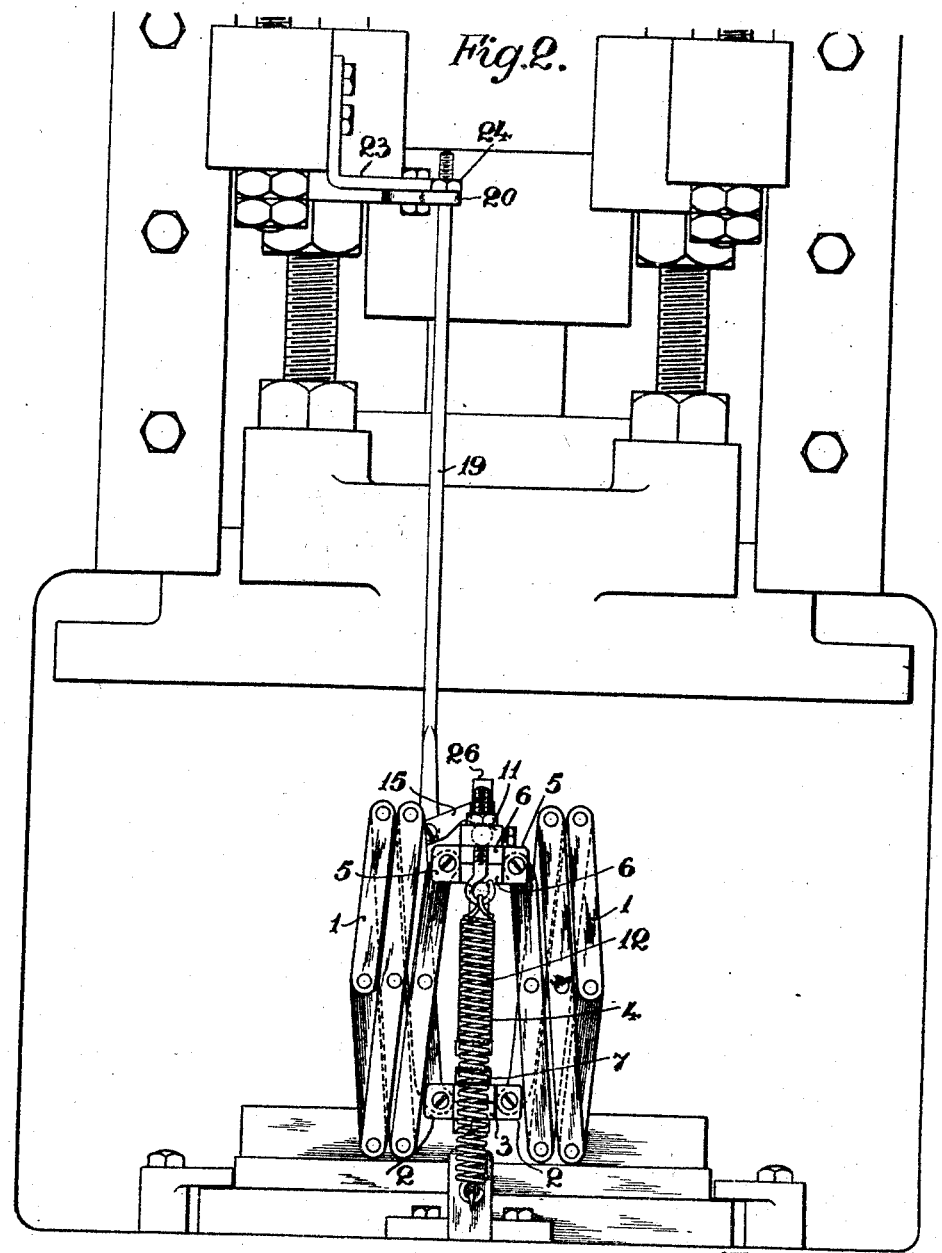

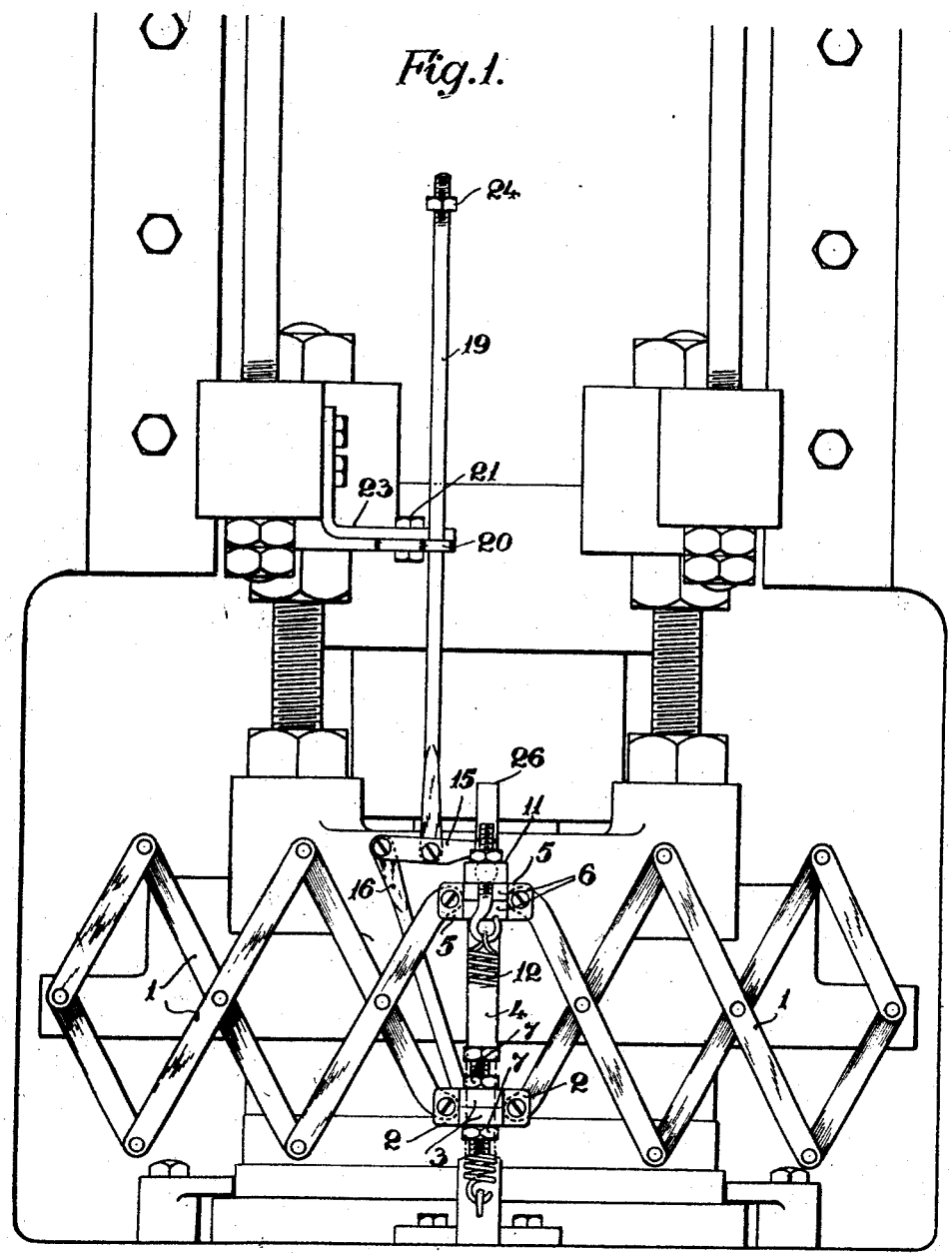

J. E. PHILLIPS.
GUARD FOR POWER PRESSES.
APPLICATION FILED APR. 14, 1920.
1,366,704.
Patented Jan. 25, 1921.
6 SHEETS—SHEET 3.
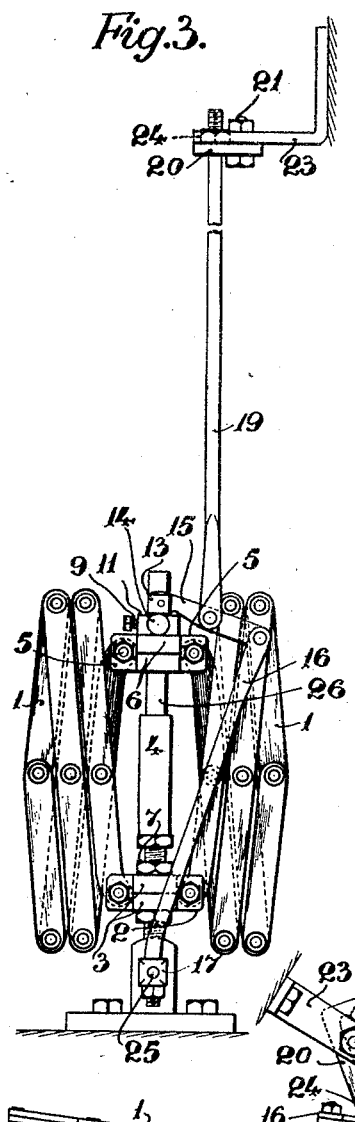
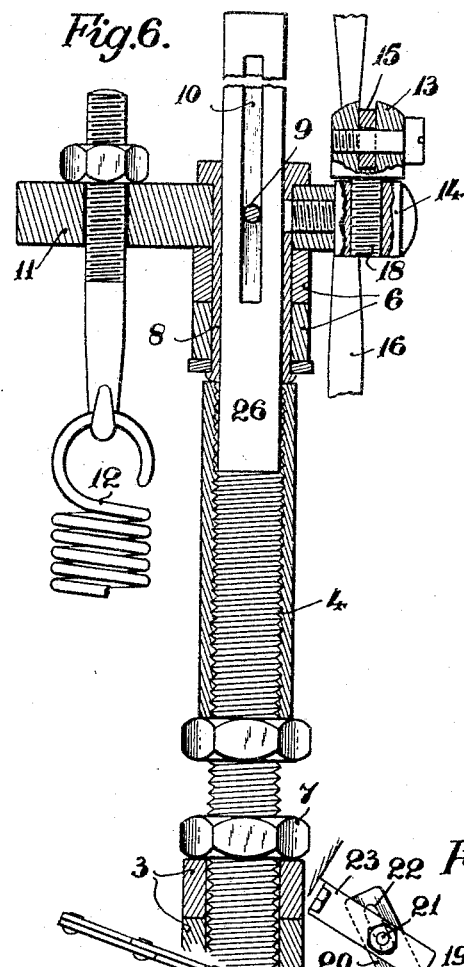
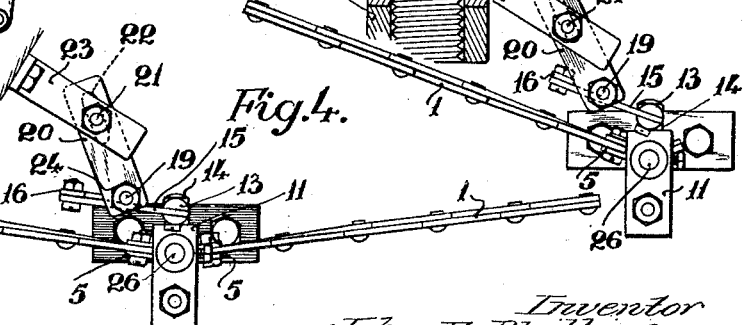
Inventor
John E. Phillips

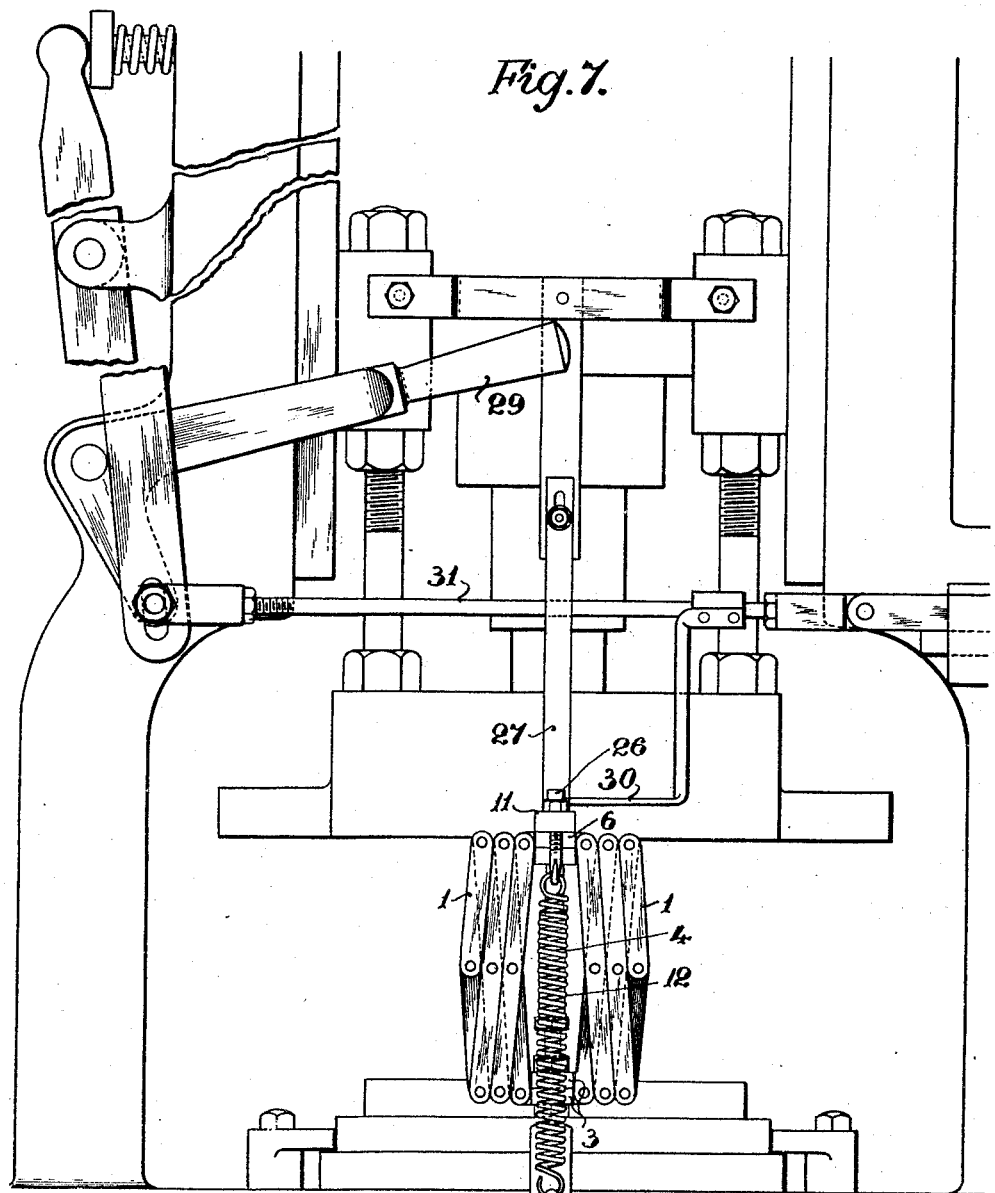

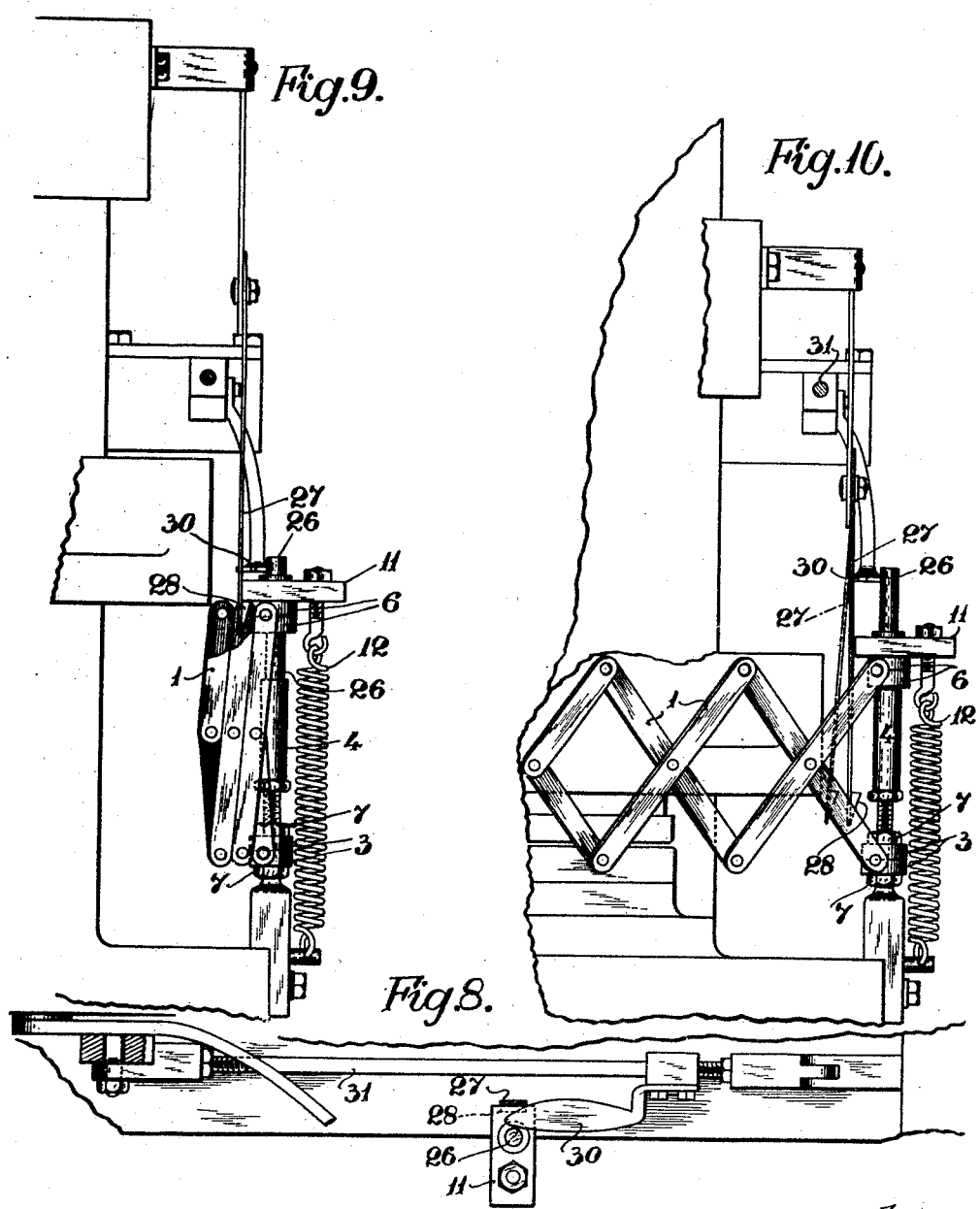

J. E. PHILLIPS.
GUARD FOR POWER PRESSES.
APPLICATION FILED APR. 14, 1920.

1,366,704.

Patented Jan. 25, 1921.
6 SHEETS—SHEET 6.

Inventor
John E. Phillips
by
Attorney

UNITED STATES PATENT OFFICE.

JOHN EDWIN PHILLIPS, OF BIRMINGHAM, ENGLAND.

GUARD FOR POWER-PRESSES.

1,366,704.  Specification of Letters Patent.  Patented Jan. 25, 1921.

Application filed April 14, 1920. Serial No. 373,902.

*To all whom it may concern:*

Be it known that I, JOHN EDWIN PHILLIPS, a subject of the King of Great Britain, residing at Birmingham, England, have invented certain new and useful Improvements in Guards for Power-Presses, of which the following is a specification.

This invention relates to guards for power presses, said guards being of the kind comprising two lazy-tongs or like collapsible and extensible frames mounted upon a vertical axis and operated by an actuating device, so that the frames can be extended into their operative or safety position prior to the upper tool or die carried by the plunger of the press descending into the work space.

The object of the present invention is to provide improved means for operating the guard.

The said invention consists essentially in positively withdrawing or collapsing the frames, by means of the plunger of the press, against the action of a spring, which latter acts to extend the guard frames into their operative position on the withdrawal means being disengaged or disconnected from the guard-actuating device.

Figure 1 of the accompanying drawings is a front elevation showing the guard extended in front of the press.

Fig. 2 is a similar view but shows the plunger raised and the guard collapsed.

Fig. 3 is a rear view of the guard when collapsed.

Fig. 4 represents a plan.

Fig. 5 is a plan showing the angle of the guard frame adjusted and the actuating means similarly adjusted.

Fig. 6 represents a vertical sectional elevation, upon a larger scale, of the vertical axis upon which the guard frames are mounted.

Fig. 7 is a front elevation of a modification, the guard being collapsed.

Fig. 8 is a plan.

Fig. 9 is a side view with the guard collapsed, and

Fig. 10 is a similar side view showing the plunger down and the guard extended.

Figure 11:
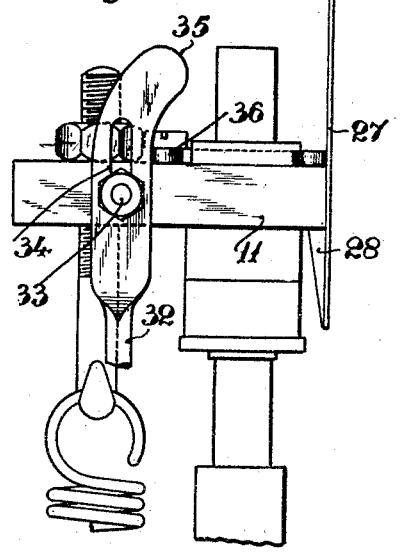
Figs. 11 and 12 are side elevation and plan of another form.

Referring to Figs. 1 to 6, the guard comprises two extensible and collapsible frames 1, 1, of lazy-tongs construction, of which the lower extremities of the inner end members are pivoted to lugs or brackets 2 carried by collars 3 fixed by nuts 7 upon a vertical axis 4 attached to the bed of the press. The upper extremities of the end members of the frame are pivoted to similar lugs or brackets 5 carried by collars 6 rotatably mounted upon a sleeve 8 which is feathered to slide upon the upper adjustable portion of the vertical axis, said sleeve 8 having a pin or projection 9 engaging a vertical groove 10 in the axis (see Fig. 6). Fixed upon the sleeve 8 above the collars 6 is a forwardly extending arm or bracket 11 to which the upper end of a coiled tension spring 12 is connected, the lower end of the spring being anchored to the base of the vertical axis 4. This spring acts so as normally to draw the sleeve downward, together with the collars 6 thereon, thus extending the guard frames 1, 1, into their operative positions, as in Fig. 1.

The frames are adapted to be collapsed, when the plunger of the press rises, by means which transmits the upward motion of the plunger to the sliding actuating sleeve of the guard. Thus, as shown, swivelly mounted upon the arm or head 11 of the sliding sleeve 8 is a swivel pin or post 13 having a screw-threaded end 18 engaging a tapped hole in a projecting part 14 screwed into the arm 11, so as to turn in a horizontal plane, and pivoted to the part 13, so as to turn in a vertical plane, is a lever or link 15 whose opposite end is jointed to the summit of an inclined support or bracket 16 the lower end of which is swivelly or rotatably mounted within a bearing 17 carried by the foot of the vertical axis. Connected to the lever 15 intermediate its ends is the lower end of a vertical rod 19 whose upper end passes through and can slide within an aperture in an arm or link 20 adjustably connected by a pin and slot 21, 22 to a bracket 23 attached to the plunger of the press the rod 19 being provided, upon the upper face of the arm 20, with a stop or abutment 24, which may conveniently be in the form of a nut. When the plunger rises the bracket arm 20 engages the abutment 24 and raises the sliding sleeve 8 of the guard, so collapsing the lazy-tongs frames against the action of the spring 12, which is extended, as shown in Fig. 2. As the plunger starts to descend, the spring 12 is allowed to come into action and extends the guard frames, and the bracket arm 20 on the plunger moves idly over the connecting rod 19, as shown in Fig. 1; and likewise, as the plunger rises, the arm 20 slides upward over the rod until it meets the abutment 24, when it causes the guard to collapse, as above described.

The angle at which the guard frames 1, 1, are set can be adjusted and re-set by slackening the two nuts 7 on a screw-threaded portion of the vertical axis 4, then turning the collars 3 about the latter, and re-tightening the nuts. When this adjustment is made the connecting rod 19, with the lever 15 and inclined swiveling support or bracket 16, are swung angularly so that the lever 15 takes up a position approximately parallel to one of the guard frames, a corresponding adjustment being made, by means of the pin-and-slot connection 21, 22, between the plunger bracket 23 and the arm or link 20 carried thereby, as shown in Fig. 5. The swiveling support 16 is adapted to be fixed in its adjusted position by a set-screw 25.

Referring to the modification illustrated in Figs. 7 to 10, the guard comprises two extensible and collapsible lazy-tongs frames 1, 1, of which the lower extremities of the inner end members are pivoted to lugs or brackets carried by collars 3 fixed upon a vertical axis 4. The upper extremities of the end members of the frames are pivoted to similar lugs or brackets carried by collars 6 fixed upon a vertical stem 26 sliding within a socket or guide sleeve 27 carried by the vertical axis 4 upon which the lower portions of the frames are mounted. This vertical stem 26 is provided, above the collars 6, with a forwardly extending arm or bracket 11 to which the upper end of a coiled tension spring 12 is connected, the lower end of the spring being anchored to the bed of the press. This spring 12 acts so as normally to draw the stem 26 downward, together with the collars 6 thereon, thus extending the guard frames into their operative positions, as in Fig. 10. The frames are collapsed, when the plunger of the press rises, by means of a catch device consisting of a depending spring blade 27 attached at its upper end to the plunger and carrying at its lower end a catch head 28 which engages beneath the rear end of the arm 11 at the top of the sliding stem, thus raising the latter together with the collars to which the upper portions of the guard frames are connected, thereby collapsing the said frames, as in Fig. 9. When, however, the clutch lever 29 of the press is operated, a wedge 30, carried by a sliding rod 31 operated by the said lever, is forced between the sliding stem 26 and the front face of the spring blade 27, thereby forcing the catch out of engagement, whereupon the spring 12, which has been extended during the collapsing of the guard, acts to draw down the sliding stem 26 and thus extends the guard frames (as in Fig. 10) prior to the descent of the plunger. The catch 28 is so arranged that it does not engage with the head 11 until the plunger has completed a portion of its up-stroke. On the descent of the plunger the catch head 28 wipes past the head 11 of the sliding stem.

Figure 12:
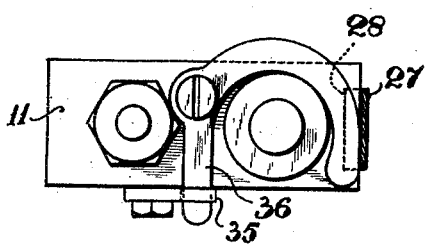

Instead of a wedge being employed for releasing the catch, a lever, cam or other suitable device operated by the clutch lever or pedal may be employed. Thus, in the case of a pedal-operated clutch, as in Figs. 11 and 12, the pedal has connected to it a vertical sliding link or rod 32 the upper end of which is guided by a pin 33 engaging a slot 34, and is shaped upon one edge in the form of a cam 35 which engages one arm of a bell-crank lever 36, pivoted to the arm or head 11, so that when the link 32 is drawn down it operates the bell-crank lever so as to release the catch 27, 28.

Figure 13:
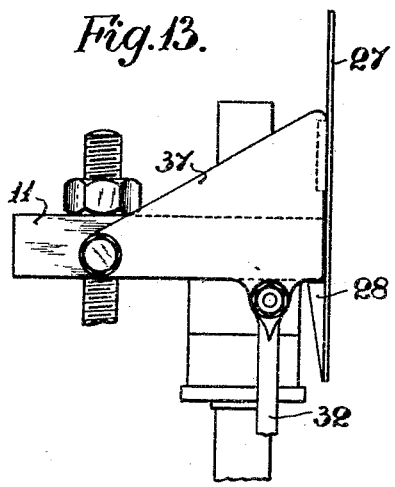
Figs. 13 and 14 are side and front elevations of a further modification.
Figure 14:
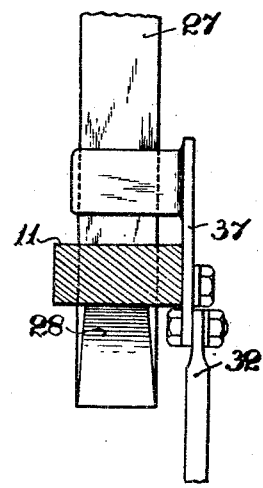

In the form shown in Figs. 13 and 14, a rod 32 connected to the pedal operates a lever 37 pivoted to the head 11 and turning in a vertical plane, so that the said lever engages the spring blade 27 and releases the catch 28.

Having fully described my invention, what I desire to claim and secure by Letters Patent is:—

1. A guard for a power press comprising two collapsible and extensible frames, an actuating device operated by the plunger of the press for collapsing the frames when the said plunger rises, a spring tending to extend the frames, and means for disconnecting the plunger from the actuating device before said plunger reaches the work space of the press.

2. A guard for a power press comprising two collapsible and extensible frames, an actuating device for collapsing the frames, lifting means carried by the plunger of the press for connection with the actuating device in order to collapse the guard, a spring tending to extend the frames, and means whereby the lifting means are disconnected from the actuating device before the plunger descend to the work space.

3. A guard for a power press comprising two collapsible and extensible frames, an actuating device for collapsing the frames, means associated with the plunger of the press and the actuating device adapted, on the upward movement of the plunger, to raise the actuating device to collapse the frames but having no influence on the said actuating device on the downward movement of the plunger and a spring connected to the actuating device tending to extend the frames.

4. A guard for a power press comprising two collapsible and extensible frames, a rod for collapsing the frames, a bracket carried by the plunger of the press and having an opening through which the upper end of the rod freely passes, an abutment upon the end of the rod above the bracket adapted to be engaged by the bracket when the plunger rises, and to be disengaged therefrom when the plunger descends, and a spring tending to extend the frames.

5. A guard for a power press comprising two collapsible and extensible frames mounted and adjustable to different angular positions upon a common vertical axis, a sliding member mounted on said axis and connected to the frames, a lever member swivelly jointed to said sliding member, an angularly disposed support connected to the outer end of the lever member and swivelly mounted at its lower end, a rod connected to the lever member, a bracket carried by the plunger of the press and having an opening through which the upper end of the rod freely passes, an abutment upon the end of the rod above the bracket, and a spring connected to the sliding device tending to extend the frames.

In testimony whereof I have signed my name to this specification in the presence of two subscribing witnesses.

JOHN EDWIN PHILLIPS.

Witnesses:
N. L. SKERRETT,
W. L. SKERRETT.